E. A. COTTÉ.
ELECTRICAL ACCUMULATOR.
APPLICATION FILED NOV. 28, 1917.
1,277,389.
Patented Sept. 3, 1918.
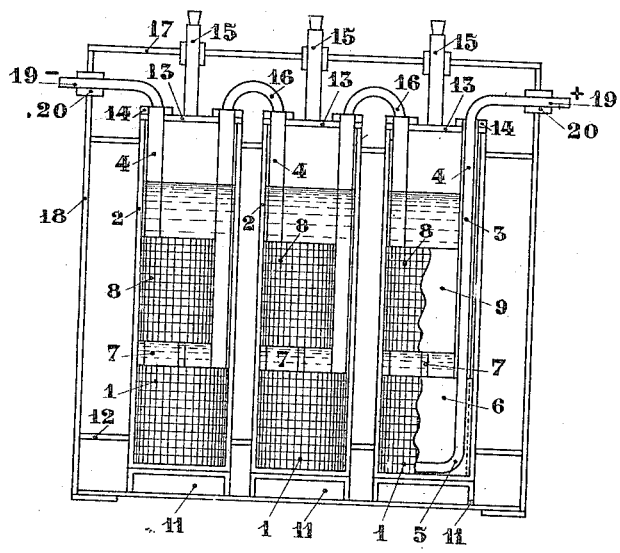
Inventor:
Emile Alexandre Cotté
per H. W. Plucker
Attorney.

UNITED STATES PATENT OFFICE.

EMILE ALEXANDRE COTTÉ, OF PARIS, FRANCE.

ELECTRICAL ACCUMULATOR.

1,277,389.  Specification of Letters Patent.  Patented Sept. 3, 1918.

Application filed November 28, 1917. Serial No. 204,463.

*To all whom it may concern:*

Be it known that I, EMILE ALEXANDRE COTTÉ, a citizen of the Republic of France, residing at 1 Rue de l'Alboni, Paris, in the Republic of France, have invented certain new and useful Improvements in Electrical Accumulators, of which the following is a specification.

The present invention relates to electrical accumulators the cells of which are contained in a closed receptacle, through the walls of which there pass on the one hand the electrodes of the accumulator and on the other hand the tubes for the escape of gas.

In the accumulators at present in use, electrolysis effects are generally produced between the stems of the electrodes through the thin layer of electrolyte which spreads over the cover of the receptacle on account of a small quantity of liquid being carried along by the escaping gases through the tubes opening above the cover.

With batteries of high voltage, this electrolysis effect may cause their discharge in a comparatively short time.

The object of the improvements forming the subject-matter of this invention is to remove this disadvantage. It consists in employing, for each accumulator cell a closed jar through the cover of which there pass the electrode stems and the tube for the escape of gas from the cell in question and furthermore, for the battery of cells as a whole, a closed vessel the cover of which affords passage to the escape tubes of all the cells and one or two side walls of which afford passage to the end electrode stems of the battery. By this means the tops of the covers of the jars are preserved from any deposit of transported electrolyte, and the danger of electrolysis between the end electrode stems, which pass through the outer vessel at points some distance apart, is negligible.

Another improvement consists in the arrangement of the electrodes themselves.

The positive electrode completely fills the lower part of each jar. The negative electrode is supported by a spider of insulating material resting on the positive electrode and following the ascending and descending movements of the surface of the latter in proportion as it increases and decreases in size during charging and discharging. The anode and the cathode are therefore always exactly the same distance apart, which is not the case in ordinary cells, in which the plates are placed vertically and subjected to short-circuiting between themselves in consequence of their deformation or of the accumulation of slime in the bottoms of the jars, such slime arising from the formation, at the positive electrode of peroxid of the metal forming such electrode.

One constructional form of an accumulator according to the present invention is illustrated in sectional elevation in the accompanying drawing by way of example.

A basket 1 of antimonial lead, celluloid, ebonite or other suitable material, of convenient shape and height, rests directly on the bottom of the jar 2 of each accumulator cell, and slides loosely in the jar.

A rod 3 of antimonial lead, insulated at 4, and widening out at the bottom of the basket at 5 serves as an electrode stem.

The basket is filled with active material 6, generally spongy lead treated in a special manner, forming the positive electrode.

Upon this material there rests a movable spider of insulating material 7, a few millimeters high, which supports a second basket 8, exactly like the previous one, also filled with active material 9, forming the negative electrode.

It is possible, according to the height and internal dimensions of the jars, to pile several baskets on top of one another, which enables the capacities to be proportioned to the current densities per unit of surface of the electrodes.

This arrangement enables the distance between the active masses or electrodes to be kept invariable, however they may expand or contract during the charging and discharging of the cells.

Short circuits, which frequently occur between the plates of ordinary accumulators, are therefore obviated.

Each cell rests on a little spider forming a dish 11. An insulating collar 12 keeps it at the proper distance from the adjacent cells.

The stems of the electrodes pass out through the covers 13, fluid tightness being insured by means of india rubber rings 14, according to the arrangement usually adopted.

The height of the tube 15 for the escape of the gases is about double the distance between the top of the connections 16 and the cover 13 of the jars. The internal diameter of this tube is calculated in such a manner that atmospheric pressure retains the electrolyte if the accumulator is upset.

When the cells have been connected to one another they are inclosed in a common vessel 18 of celluloid, which is hermetically sealed by the cover 17.

The end electrode stems pass out at 19 through india-rubber rings 20 on two opposite sides of the vessel 18.

It will be seen that this arrangement enables the covers 13 of the jars to be kept sheltered from splashes of acid and the connections always to be kept dry during the charging, discharging or transportation of the battery. Electrolysis, which seems inevitable between the external connections in the ordinary high-voltage batteries, is therefore completely eliminated by the present arrangement.

What I claim and desire to secure by Letters Patent of the United States is:—

1. An electrical accumulator of the portable type comprising in combination an outer casing having a cover, a plurality of cells located in said casing, each cell having a cover and having electrode stems and a vertically directed gas escape pipe passing through this cover, the electrode stems extending upwardly only as far as the chamber between the casing cover and the cell covers, and each escape pipe extending through said chamber and casing cover and opening into the atmosphere just above the latter cover, substantially as described.

2. An electrical accumulator of the portable type comprising in combination an outer casing having a cover, a plurality of cells located in said casing, each cell having a cover and having electrode stems and a vertically directed gas escape pipe passing through this cover, the electrode stems extending upwardly only as far as the chamber between the casing cover and the cell covers, the end electrodes passing through side walls of the casing, and each escape pipe extending through said chamber and casing cover and opening into the atmosphere just above the latter cover, substantially as described.

3. An electrical accumulator of the portable type comprising a plurality of cells each having a cover, a basket filled with active material located at the lower part of each cell and forming the positive electrode, a basket filled with active material constituting the negative electrode located above said positive electrode, an insulating distance piece interposed between said electrodes, electrode stems passing from said electrodes through the cell cover, a gas escape pipe passing through said cover, an hermetically sealed outer casing, said gas escape pipes and the end electrode stems of the cells passing through the walls of the said external casing, substantially as described.

In testimony whereof I affix my signature in presence of two witnesses.

EMILE ALEXANDRE COTTÉ.

Witnesses:
 EUGENE HESTAVER,
 CHAS. P. PRESSLY.